United States Patent [19]
Tallant, II et al.

[11] Patent Number: 5,610,502
[45] Date of Patent: Mar. 11, 1997

[54] BOOST POWER SUPPLY WITH CLOCK PERIOD COMPENSATION

[75] Inventors: James C. Tallant, II, Carmel; Kevin J. Hawes, Greentown, both of Ind.

[73] Assignee: Delco Electronics Corp., Kokomo, Ind.

[21] Appl. No.: 518,733

[22] Filed: Aug. 24, 1995

[51] Int. Cl.$^6$ .................................................. G05F 1/46
[52] U.S. Cl. .................................................. 323/222; 363/89
[58] Field of Search ........................... 323/222, 285, 323/241, 272, 283, 271, 207, 201, 288, 286, 290, 284; 363/98, 72, 132, 124, 89, 39, 40, 41, 49, 65

[56] References Cited

U.S. PATENT DOCUMENTS 5,001,620   3/1991   Smith ........................................ 363/89

*Primary Examiner*—Aditya Krishnan
*Attorney, Agent, or Firm*—Mark A. Navarre

[57] ABSTRACT

A boost supply has an inductor coupled to supply voltage and connected to ground through a charging switch and connected through a diode to charge a storage capacitor when the switch is open to attain a boost voltage higher than supply voltage. A clock for controlling the switch operation is an astable circuit having an operational amplifier with an RC timing feedback to one input and a hysteresis feedback to the other input. The hysteresis circuit includes a resistor coupled at one end to a reference voltage and through a diode to the amplifier output. This circuit has an increasing frequency with increasing supply voltage to reduce switch closed time and limit the increase of inductor current to safe levels.

5 Claims, 3 Drawing Sheets

BOOST POWER SUPPLY WITH CLOCK PERIOD COMPENSATION

FIELD OF THE INVENTION

This invention relates to a boost power supply and particularly one that has compensation for high supply voltages.

BACKGROUND OF THE INVENTION

In a motor vehicle where battery voltage is subject to variation over a large range, say, 4.5 volts to more than 10 volts, a boost power supply is used to provide a consistent voltage, say, about 10 volts, to drive electronic circuits. In one type of boost supply an inductor coupled to battery voltage has its current interrupted by a switch in a manner which induces voltage greater than the battery voltage. The resulting inductor current charges a capacitor up to a desired output voltage where the switching is suspended. A switch frequency is chosen to yield the necessary output voltage when the battery voltage is low. The peak current flowing through the switch is proportional to the battery voltage so that at high battery voltages high inductor currents are present and may lead to undesirable inductor saturation. These higher inductor saturation currents also flow through the switch which is typically a transistor and cause excessive power dissipation in the switch.

The problem of damaging components can be avoided by using a more expensive inductor with a higher current rating which will not saturate at high voltages. The extra expense in an electronic package is highly undesirable. Thus a solution is preferred which is inexpensive.

SUMMARY OF THE INVENTION

It is therefore an object of the invention to compensate for the effect of high battery voltage on the inductor current in a booster supply. Another object is to carry out such compensation in an inexpensive manner.

A boost voltage supply comprises an inductor connected at one end to battery voltage and the other end is connected to ground through a switch and also connected through a diode to a storage capacitor which establishes the booster output voltage. The switch is driven by an inverted clock signal from a clock capable of a variable on time. The amplitude of current developed in the inductor is proportional to the battery voltage and the time that the switch is closed. It is desired to provide shorter on times (and shorter switch closed periods) as the battery voltage increases. Then at high voltages the switch will open before the current reaches a value sufficient to saturate the inductor or to damage the switching transistor.

The timer circuit used to carry out the variable on time accomplishes the task by increasing the frequency as battery voltage increases and maintaining substantially the same duty cycle. An astable clock circuit includes an operational amplifier with an RC timer feedback to the negative input and a hysteresis feedback to the positive input. Battery voltage is applied through one resistor to the positive input and through another resistor to the amplifier output. To effect a change of frequency with battery voltage, the hysteresis circuit has a diode coupling the feedback resistor to the output and a reference voltage coupled to the junction of the diode and resistor. The result is that the clock on time decreases with increasing voltage and the inductor current is limited to non-destructive values.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
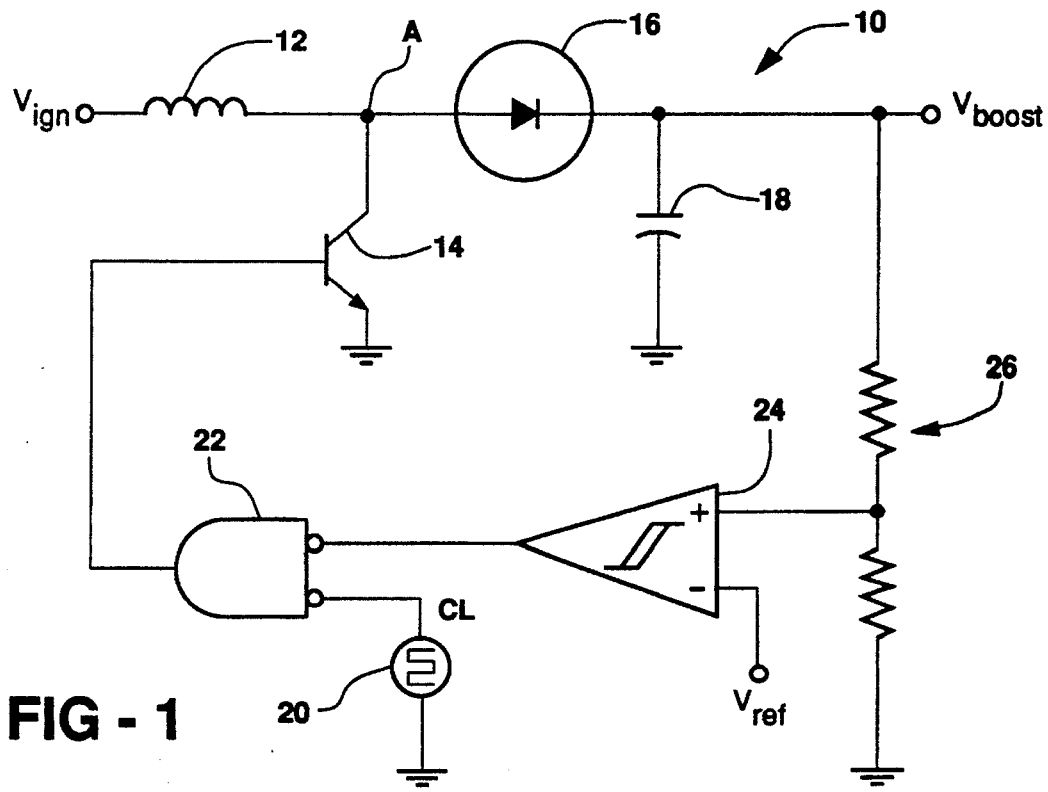
FIG. 1 is a schematic diagram of a voltage booster circuit according to the invention.

The variation in vehicle ignition voltage, due to its battery supply, is large, ranging from 4.5 volts to more than 16 volts. To supply an electronic circuit with a reliable minimum voltage at about 10 or 11 volts, a boost power supply is used. Referring to FIG. 1, such a boost circuit 10 comprises an inductor 12 coupled at one end to the battery or ignition voltage Vign, and connected at the other end (at node "A") to a charging switch 14 and to a diode 16 which feeds current to a storage capacitor 18. The voltage on the capacitor 18 is the boost or output voltage Vboost. The charging switch 14 may be, for example, an NPN transistor which is opened and closed by a clock pulse signal CL delivered from a clock 20 through an AND gate 22. The clock 20 is connected to one inverting input of the AND gate and a reference comparator 24 is connected to another inverting input of the AND gate. The reference comparator 24 has its negative input connected to a reference voltage and its positive input coupled to the boost output voltage through an adjustable voltage divider 26 which is set to a value which determines the minimum boost output voltage.

In operation, the charging switch 14 is normally open and if the battery voltage is above the selected boost output, it will be applied to the output via the inductor 12 and the diode 16. The boost output applied through the divider 26 to the comparator 24 will supply a voltage higher than the reference voltage to produce a positive comparator output, causing the AND gate 22 to be off. The clock 20, which runs continuously, is then ineffective to cause operation of the switch 14. If the battery voltage is below the desired output value and the output drops below the desired value, the comparator 24 will then produce a negative output which enables the gate 22 to pass the clock pulses. The charging switch then repeatedly closes and opens as long as the gate is enabled. When the switch 14 closes the inductor current passes through the switch and ramps up in value until the switch opens. Then the inductor current flows through the diode 16 to charge the capacitor, increasing the boost output voltage. If the boost supply is still below the target value, the switch action repeats to cause further charging of the capacitor. If the target value is achieved, the gate 22 will then close to forestall further switching.

Figure 2:
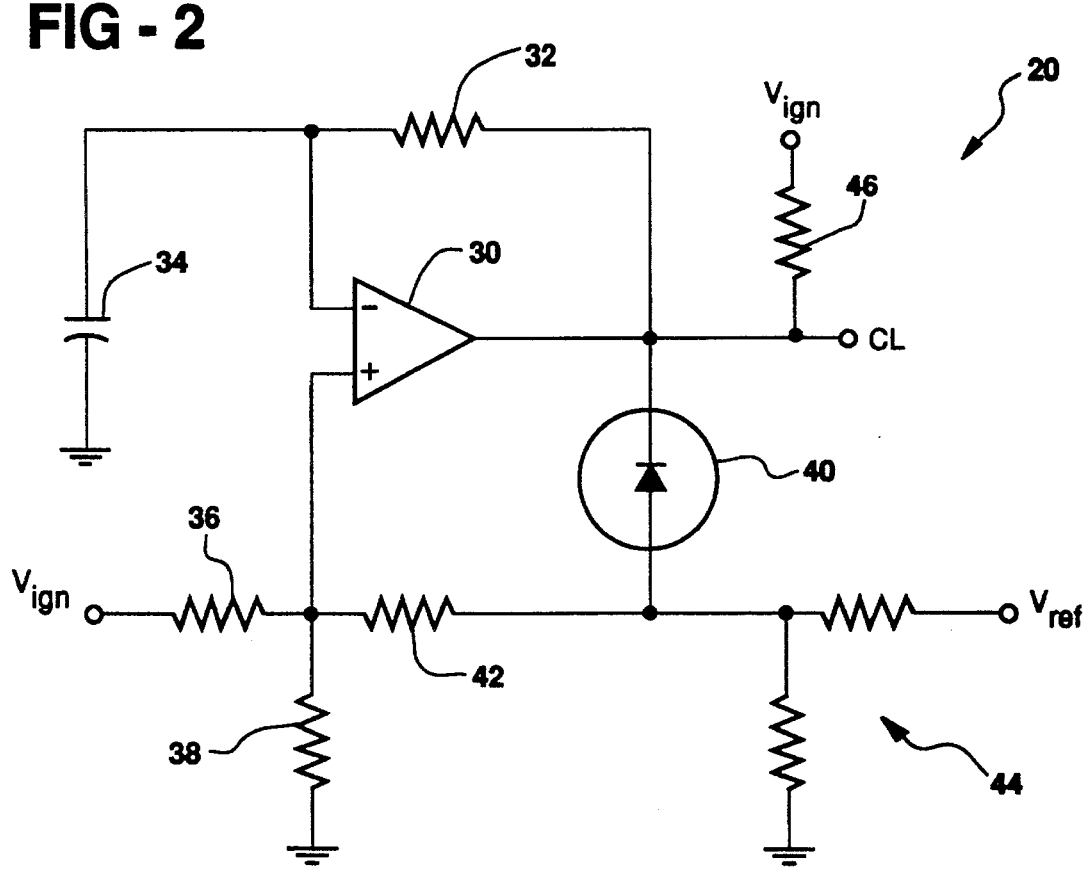
FIG. 2 is a schematic diagram of the clock of FIG. 1 according to the invention.

The clock circuit 22 as shown in FIG. 2 is similar to a fixed frequency clock except for the hysteresis feedback loop which is merely a resistor in the fixed period case and is a non-linear circuit in the period compensated case. An astable circuit includes a comparator 30 having a timing feedback comprising a resistor 32 between the output and the negative input and a capacitor 34 between the negative input and ground, forming an RC timing circuit. A voltage divider comprising resistors 36 and 38 between the supply voltage Vign and ground applies a voltage to the positive input. The hysteresis feedback includes a diode 40 and a resistor 42 serially connected between the output and the positive input, and a reference voltage Vref applied through a divider 44 to the junction of the diode 40 and resistor 42. The diode is polarized for conduction toward the comparator output. The comparator 30 output is the clock output CL and is connected through a resistor 46 to the supply voltage Vign.

In operation of the clock, the comparator 30 switches between full off and saturation as the voltage across the capacitor swings up and down between switch points set by the variable voltage on the positive input. When the comparator is in saturation the hysteresis feedback voltage applied to the positive input via the resistor 42 and the diode 40 is very low and consists of the voltage drop of the diode 40 plus the saturation voltage of the amplifier. When the comparator output is high, the hysteresis feedback voltage applied to the resistor 42 is determined by the lower of Vign and the divided value of Vref. At high voltages the switching occurs at a much higher frequency than at low voltages because the hysteresis increments do not change in proportion to the supply voltage.

Figure 3:
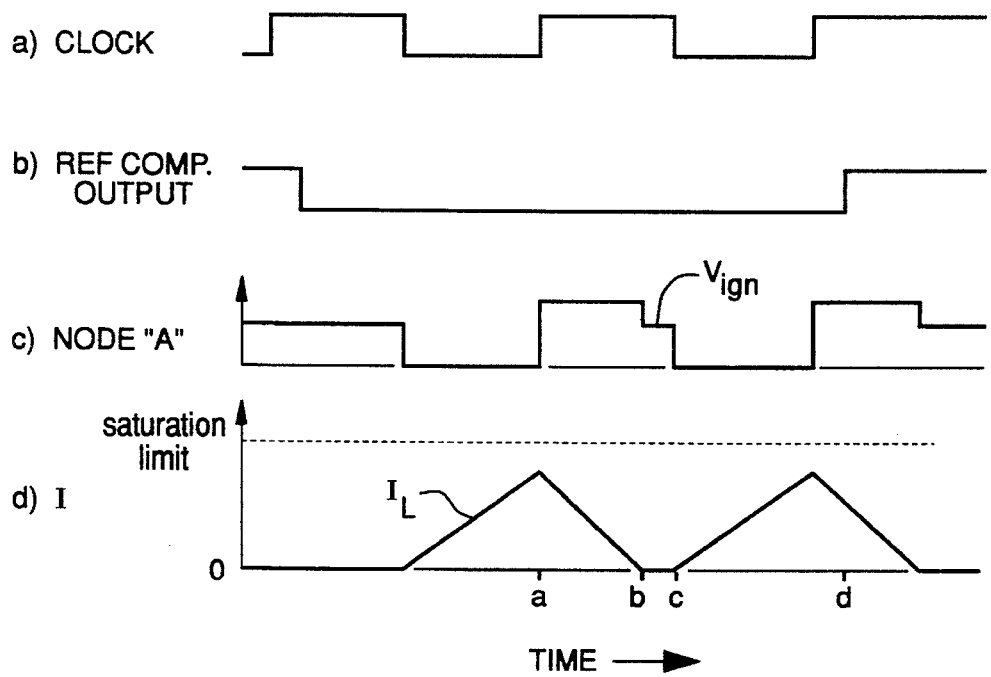
FIG. 3, parts a, b, c and d are respectively clock voltage, reference comparator output, Node "A" switch voltage, and inductor current waveforms illustrating the operation of the booster at low battery voltage, for either with or without clock period compensation.
Figure 4:
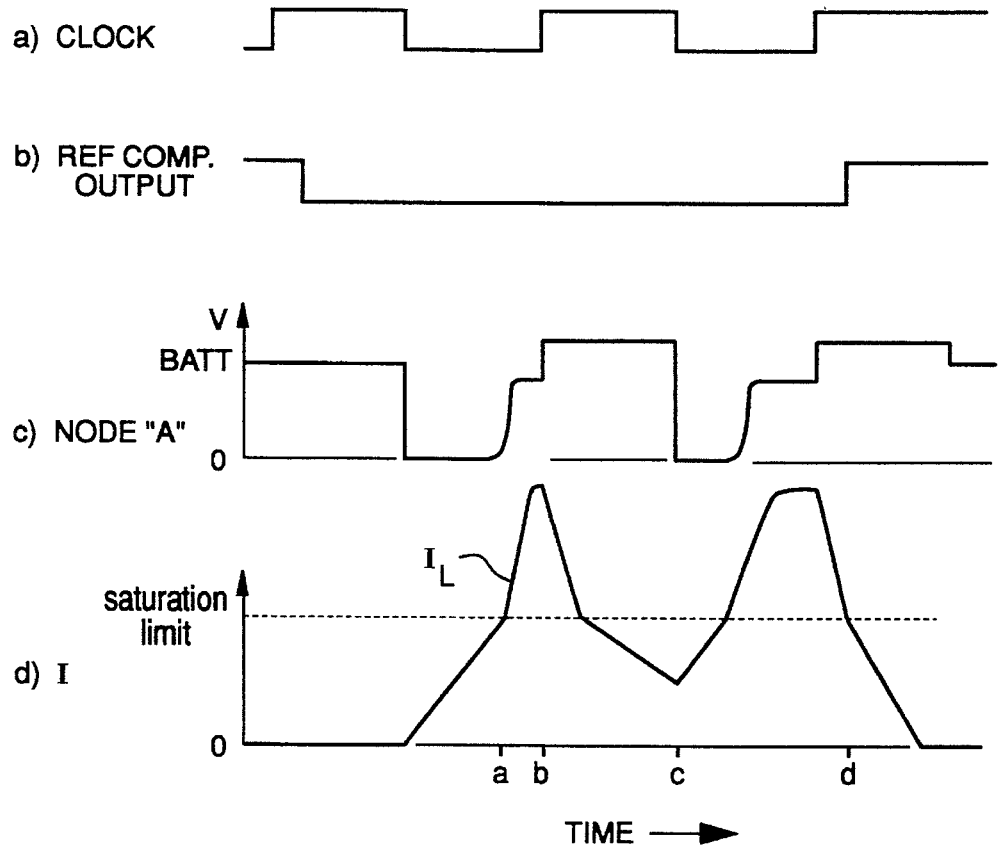
FIG. 4, parts a, b, c and d are respectively clock voltage, reference comparator output, Node "A" switch voltage, and inductor current waveforms illustrating the operation of the booster at high battery voltage.
Figure 5:
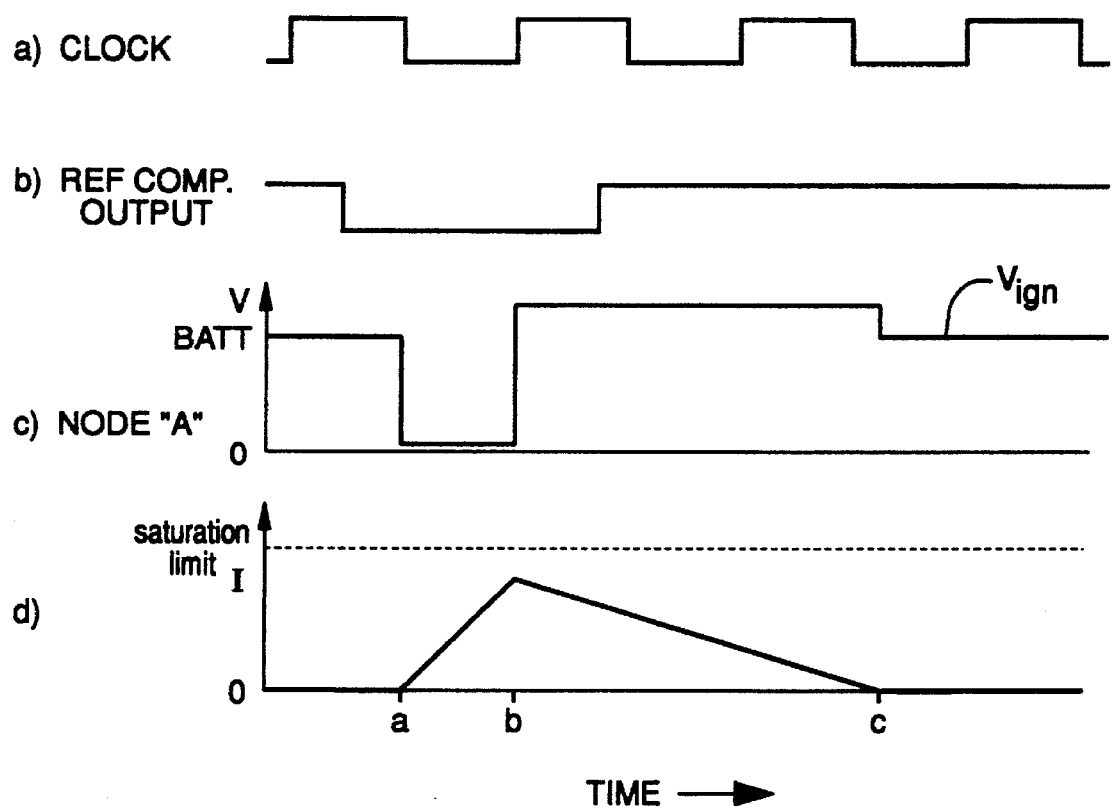
FIG. 5, parts a, b, c and d are respectively clock voltage, reference comparator output, Node "A" switch voltage, and inductor current waveforms illustrating the operation of the booster at high battery voltage, according to the invention.

Examples of the boost circuit operation with the compensated clock period are illustrated in FIGS. 3 and 5 and operation with uncompensated clock at high voltage is shown in FIG. 4. In each case the clock pulse is shown to be substantially at 50% duty cycle but this value is not essential to the invention. In FIG. 3, the supply voltage Vign is 4.5 volts and the clock operates at 17.9 kHz. At this low voltage the circuit operation is the same for both the compensated case and the uncompensated case. As the clock rises at time a, the switch 14 opens causing the voltage at node A to increase due to the inductor discharge thus charging the capacitor. When the discharge is completed, at point b, the voltage at node A drops to the supply voltage. When the clock pulse falls at point c, the switch 14 closes, pulling down the voltage at node A to ground and the inductor current $I_L$ ramps up to a peak value when the switch opens to repeat the capacitor charging. The peak value remains below the inductor saturation current limit. At point d the reference comparator 24 output goes high because the boost voltage has reached the target value, and the switch 14 is inhibited from responding to the clock pulse until the boost voltage decreases enough to switch the comparator 24.

FIG. 4 shows the uncompensated circuit operating at 10 volts. Due to the high voltage the inductor current $I_L$ increases beyond the inductor saturation limit at point a and further increase occurs at a higher rate. The collector of the transistor switch cannot conduct this amount of current so that the collector voltage (node A) rises, thus dissipating excessive power in the transistor. When the switch 14 opens at point b the current diminishes until the clock pulse again closes the switch at point c to repeat the cycle. When the reference comparator 24 goes high at point d the switch will remain open at the next clock pulse.

In contrast, the compensated circuit operating at 10 volts with a boost output target value slightly lower than 10 volts has the characteristics shown in FIG. 5. Then the clock operates at 58 kHz but only one of the clock pulses is passed by the gate, in this example, due to the target voltage having been recently attained. When the output drops below the target voltage, the gate passes the next clock pulse at time a, causing the switch to close. Then the inductor current $I_L$ ramps up at a higher rate than for the low supply voltage case of FIG. 3 case, but due to the short clock period the switch open time is short and the current is prevented from reaching the saturation limit. When the switch opens at point b, the current flows through the diode 16 to charge the storage capacitor until time c when the current terminates. While the current is flowing through the diode between times b and c, the voltage at node A is the sum of the inductor flyback voltage plus the supply voltage Vign, and thereafter assumes the value of Vign.

It will thus be seen that the expedient of modifying the hysteresis feedback of the clock circuit compensates for the effects of high voltage by decreasing the clock periods to shorten the closed period of the charging switch. It will also be appreciated that the circuit modification involves minimal increase of cost.

The embodiments of the invention in which an exclusive property or privilege is claimed are defined as follows:

1. A boost power supply for producing an output voltage at an output higher than a supply voltage at an input comprising:
   an inductor and a diode joined at a node and serially coupled between the input and the output;
   a switch connected between the node and ground whereby increasing inductor current flows through the switch when the switch is closed to attain a peak value and then flows through the diode to the output at decreasing values when the switch is open;
   clock means for operating the switch to establish the time that the switch is closed; and
   means for varying the cycle of the clock means to decrease the closed switch time upon increase in supply voltage, to thereby reduce the peak current value occurring at high supply voltages.

2. The invention as defined in claim 1 wherein the means for varying the cycle of the clock means to decrease the closed switch time comprises means for increasing the clock frequency with increasing supply voltage.

3. The invention as defined in claim 1 wherein the clock means comprises:
   an operational amplifier having an output terminal coupled to the switch, a positive input terminal coupled through a voltage divider to the supply voltage, an RC timing circuit connected between a negative input terminal and the output terminal, and a hysteresis circuit connected between the output terminal and the positive input terminal;
   the hysteresis circuit including a feedback loop having means for decreasing hysteresis to increase clock frequency upon increasing supply voltage.

4. The invention as defined in claim 1 wherein the clock means comprises:

an operational amplifier having an output terminal coupled to the switch, a positive input terminal coupled through a voltage divider to the supply voltage, a timing circuit connected between a negative input terminal and the output terminal, and a hysteresis circuit connected between the output terminal and the positive input terminal;

the hysteresis circuit including the means for varying the cycle of the clock means.

5. The invention as defined in claim 1 wherein the clock means comprises:

an operational amplifier having an output terminal coupled to the switch, a positive input terminal coupled through a voltage divider to the supply voltage, an RC timing circuit connected between a negative input terminal and the output terminal, and a hysteresis circuit connected between the output terminal and the positive input terminal;

the hysteresis circuit including a feedback loop comprising a feedback resistor and diode serially connected between the positive input terminal and the output terminal, and means for applying a reference voltage to the junction of the feedback resistor and diode.

* * * * *